United States Patent
Hasegawa et al.

(10) Patent No.: US 9,321,331 B2
(45) Date of Patent: Apr. 26, 2016

(54) LOAD-TRANSMITTING MEMBER AND VEHICLE DOOR ATTACHMENT STRUCTURE THEREOF

(71) Applicants: NIFCO, INC., Yokohama-shi, Kanagawa (JP); TOYOTA JIDOSHA KABUSHIKI KAISHA, Toyota-shi, Aichi (JP); TOYOTA MOTOR EAST JAPAN, INC., Kurokawa-gun, Myagi (JP)

(72) Inventors: Takahiro Hasegawa, Yokohama (JP); Tatsuya Sekine, Yokohama (JP); Atsushi Tamada, Kurokawa-gun (JP)

(73) Assignees: NIFCO, INC., Yokohama (JP); TOYOTA JIDOSHA KABUSHIKI KAISHA, Toyota (JP); TOYOTA MOTOR EAST JAPAN, INC., Kurokawa (JP)

( * ) Notice: Subject to any disclaimer, the term of this patent is extended or adjusted under 35 U.S.C. 154(b) by 0 days.

(21) Appl. No.: 14/407,800

(22) PCT Filed: Jun. 13, 2013

(86) PCT No.: PCT/JP2013/066403
§ 371 (c)(1),
(2) Date: Dec. 12, 2014

(87) PCT Pub. No.: WO2013/187490
PCT Pub. Date: Dec. 19, 2013

(65) Prior Publication Data
US 2015/0123423 A1    May 7, 2015

(30) Foreign Application Priority Data
Jun. 14, 2012 (JP) .................. 2012-135030

(51) Int. Cl.
B60J 5/04 (2006.01)
F16F 7/12 (2006.01)

(52) U.S. Cl.
CPC .............. B60J 5/0451 (2013.01); B60J 5/0427 (2013.01); B60J 5/0443 (2013.01); B60J 5/0458 (2013.01); F16F 7/121 (2013.01)

(58) Field of Classification Search
CPC ...... B60J 5/0451; B60J 5/0458; B60J 5/0443; B60J 5/0427; F16F 7/121
USPC .............. 296/146.6, 187.03, 187.12; 188/377
See application file for complete search history.

(56) References Cited

U.S. PATENT DOCUMENTS

2004/0124572 A1    7/2004  Tamada et al.
2008/0093889 A1*   4/2008  Yao ..................... B62D 21/157
                                                      296/187.12

(Continued)

FOREIGN PATENT DOCUMENTS

JP    U1-48-110821    12/1973
JP    A-2004-98774     4/2004

(Continued)

*Primary Examiner* — Jason S Morrow
*Assistant Examiner* — E Turner Hicks
(74) *Attorney, Agent, or Firm* — Oliff PLC

(57) ABSTRACT

A load-transmitting member attached to an inner panel includes an inside load-transmitting member serving as a first load-transmitting member and an outside load-transmitting member serving as a second load-transmitting member. Engagement holes are provided to an attachment plate formed at the inside load-transmitting member and serving as a first attachment plate, and engagement pawls are provided to an attachment plate formed at the second load-transmitting member and serving as a second attachment plate. The inside load-transmitting member and the outside load-transmitting member are engaged together to form an integral unit by engaging the engagement structures with the engagement structures.

13 Claims, 15 Drawing Sheets

(56) References Cited

U.S. PATENT DOCUMENTS

2010/0301630 A1* 12/2010 Ohta ............... B60J 5/0431
                                              296/146.6
2012/0152674 A1* 6/2012 Fukuo ............... F16F 7/121
                                              188/377

FOREIGN PATENT DOCUMENTS

| JP | A-2004-149075 | 5/2004 |
| JP | A-2009-196434 | 9/2009 |
| JP | A-2011-21673 | 2/2011 |

* cited by examiner

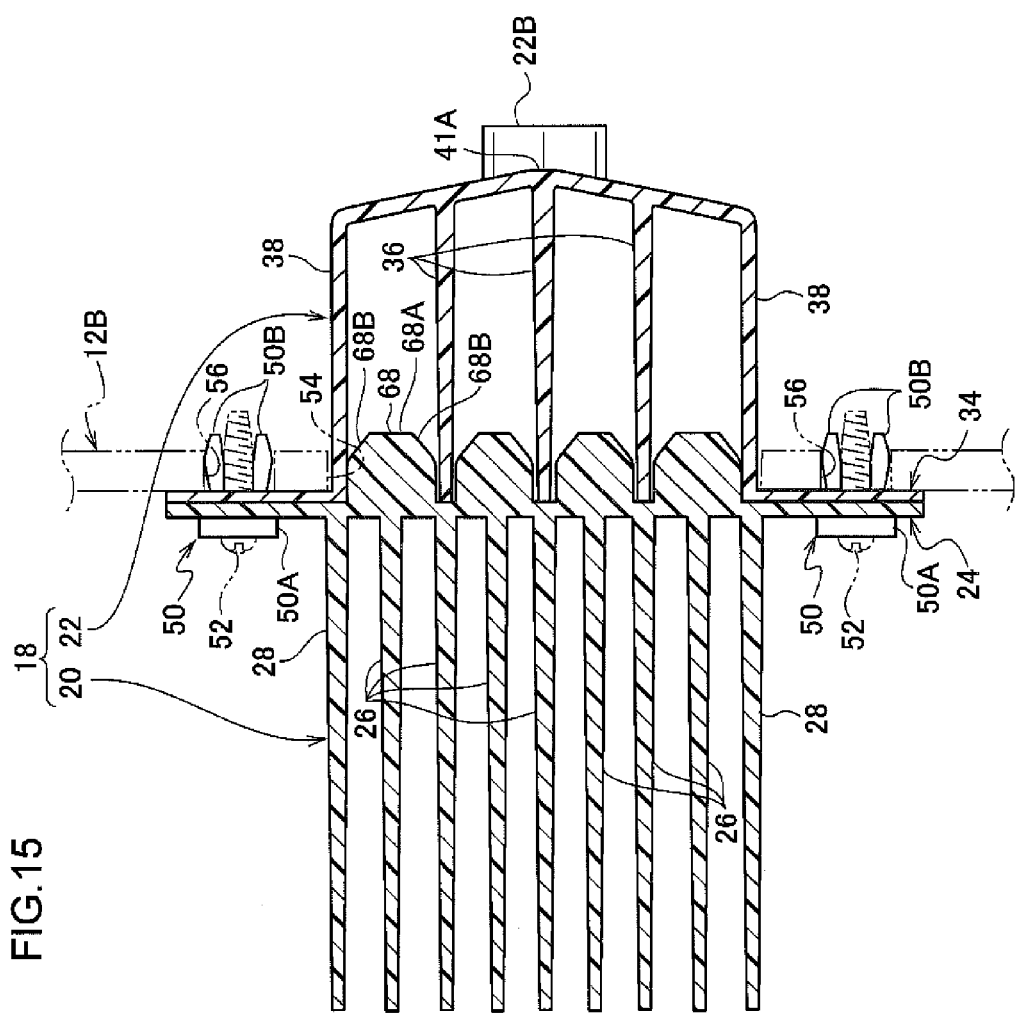

LOAD-TRANSMITTING MEMBER AND VEHICLE DOOR ATTACHMENT STRUCTURE THEREOF

TECHNICAL FIELD

The present invention relates to a load-transmitting member attached to a panel member, and a vehicle door attachment structure of the load-transmitting member.

BACKGROUND ART

A load-transmitting member that transmits load from a vehicle body outside to the vehicle body inside in the event of a collision at a vehicle body side face, referred to as a side collision, is provided to vehicles, and in particular automobiles.

For example, in Japanese Patent Application Laid-Open (JP-A) No. 2011-21673, a load-transmitting member (an impact absorbing member) is fixed to a door panel member provided to a vehicle door, a first shock absorbing portion of the load-transmitting member is made to project to the vehicle inside of the door panel member, and a second shock absorbing portion of the load-transmitting member is made to project to the vehicle outside of the door panel member. Moreover, a higher impact absorbing strength is obtained at the vehicle outside than at the vehicle inside by making the second shock absorbing portion weaker than the first shock absorbing portion.

In JP-A No. 2009-196434, a load-transmitting member (a side collision pad) is configured from an outer side pad and an inner side pad. The outer side pad is disposed between an outer panel and an inner panel of a vehicle cabin door, and the inner side pad is disposed between the inner panel and a door trim, in a state in which a portion of the inner side pad is inserted into a hollow portion provided to the outer side pad.

LIST OF PATENT DOCUMENTS

Patent Document 1: JP-A No. 2011-21673
Patent Document 2: JP-A No. 2009-196434

SUMMARY OF INVENTION

Technical Subject

The present invention provides a load-transmitting member and a vehicle door attachment structure of the load-transmitting member with high versatility.

Solution to Subject

A first aspect of the present invention provides a load-transmitting member including: a first load-transmitting member that transmits load and includes a first attachment plate that is configured to be attachable to a panel member, and that has plural first ribs projecting out from one face of the first attachment plate and a first enclosing wall that projects outs from the first attachment plate and encloses the first ribs; a second load-transmitting member that transmits load and includes a second attachment plate that is overlapped with the first attachment plate, and that has plural second ribs projecting out from one face of the second attachment plate and a second enclosing wall that projects outs from the second attachment plate and encloses the second ribs; and engagement structures provided at the first attachment plate and the second attachment plate in order to engage the first attachment plate with the second attachment plate.

In the aspect described above, the load-transmitting member includes the first load-transmitting member and the second load-transmitting member, and the first attachment plate engages with the second attachment plate through engagement structures provided at the first attachment plate of the first load-transmitting member and the second attachment plate of the second load-transmitting member.

As a result, cases in which the load-transmitting member is attached to a load-transmitting member of another vehicle or another location can sometimes be addressed by applying one out of the first load-transmitting member and the second load-transmitting member as a common member, and changing the shape of the other member, according to the location at which the load-transmitting member is attached. The overall shape of the load-transmitting member does not therefore need to be revised when being utilized in another vehicle or another location, and versatility is increased.

In a second aspect of the present invention, the first aspect of the present invention may be configured such that the engagement structures are formed by a first flange portion and a second flange portion. The first flange portion is provided at the first attachment plate and is extended to outside of the first enclosing wall, the second flange portion is provided at the second attachment plate and is extended to outside of the second enclosing wall so as to overlap with the first flange portion.

In the aspect described above, each of the engagement structures is formed by the first flange portion extending to the outside of the first enclosing wall of the first attachment plate, and the second flange portion extending to the outside of the second enclosing wall of the second attachment plate. The engagement structures engage the first load-transmitting member and the second load-transmitting member by overlapping the first flange portion and the second flange portion. The first load-transmitting member and the second load-transmitting member can thereby be easily integrated together.

In a third aspect of the present invention, the second aspect of the present invention may be configured such that the engagement structures include an engagement pawl that is provided to one of the first flange portion or the second flange portion, and an engaged portion that is provided to the other of the first flange portion or the second flange portion and engages with the engagement pawl.

In the aspect described above, the engagement pawl that is provided to one of the first flange portion or the second flange portion engages with the engaged portion that is provided to the other of the first flange portion or the second flange portion. The first load-transmitting member and the second load-transmitting member can thereby be instantaneously integrated together by the engagement pawl and the engaged portion.

In a fourth aspect of the present invention, either the second aspect or the third aspect of the present invention may be configured such that a first attachment hole is formed at the first flange portion for attachment to the panel member, a second attachment hole is formed at the second flange portion for attachment to the panel member, the first attachment hole and the second attachment hole are aligned with each other by overlapping the first flange portion and the second flange portion, and an attachment member is inserted into the first attachment hole and the second attachment hole from one side of a face of the overlapping first flange portion and second flange portion.

In the aspect described above, the first attachment hole formed at the first flange portion and the second attachment hole formed at the second flange portion are aligned with each other by overlapping the first flange portion and the second flange portion. The attachment member can thereby be inserted into the first attachment hole and the second attachment hole from one side of the face of the overlapping first flange portion and second flange portion. This enables the load-transmitting member to be easily attached to the panel member by only working from the one side of the face of the overlapping first flange portion and second flange portion.

A fifth aspect of the present invention is the fourth aspect of the present invention which may be configured such that the attachment member includes an engagement portion that opens on insertion into the first attachment hole and the second attachment hole, and the attachment member is fixed to an attachment hole formed in the panel member so as to retain an overlapped state of the first flange portion and the second flange portion.

In the aspect described above, the first flange portion and the second flange portion are retained in an overlapped state by enlargement of the engagement portion of the attachment portion that has been inserted into the first attachment hole and the second attachment hole. This enables positional misalignment of the first load-transmitting member and the second load-transmitting member to be prevented when the load-transmitting member is being fixed to the panel member.

In a sixth aspect of the present invention, any one of the first aspect to the fifth aspect of the present invention may be configured to include a misalignment prevention protrusion that is formed at one of the first attachment plate or the second attachment plate and that is fitted into a space formed between the ribs, or between the rib and the enclosing wall, on the other of the first attachment plate or the second attachment plate.

In the aspect described above, the misalignment prevention protrusion formed at one of the first attachment plate or the second attachment plate is fitted into the space formed between the ribs, or between the rib and the enclosing wall, on the other of the first attachment plate or the second attachment plate. This enables relative movement of the first load-transmitting member and the second load-transmitting member to be prevented in a direction running along the in-plane direction of the first attachment plate and the second attachment plate.

In a seventh aspect of the present invention, any one of the first aspect to the sixth aspect of the present invention may be configured to include at least one of a first end face wall portion or a second end face wall portion. The first end face wall portion is provided at a leading end of the first ribs enclosed by the first enclosing wall and blocks spaces formed between the first ribs and the first enclosing wall. The second end face wall portion is provided at a leading end of the second ribs enclosed by the second enclosing wall and blocks spaces formed between the second ribs and the second enclosing wall.

The aspect described above includes at least one of the first end face wall portion or the second end face wall portion. The first end face wall portion is provided at the leading end of the first ribs enclosed by the first enclosing wall and blocks spaces formed between the first ribs and the first enclosing wall. The second end face wall portion is provided at the leading end of the second ribs enclosed by the second enclosing wall and blocks spaces formed between the second ribs and the second enclosing wall. This enables load from a structural object to be effectively transmitted because the structural object or the like, that transmits load to the load-transmitting member, contacts the first end face wall or the second end face wall.

In an eighth aspect of the present invention, any one of the first aspect to the seventh aspect of the present invention may be configured such that the panel member is a vehicle door panel.

In the aspect described above, since the panel member is a vehicle door panel, cases in which the load-transmitting member is attached to another vehicle door can sometimes be addressed by applying one out of the first load-transmitting member and the second load-transmitting member as a common member, and changing the shape of the other member, according to the location at which the load-transmitting member is attached. The overall shape of the load-transmitting member does not therefore need to be revised when being utilized for other vehicle doors, and versatility is increased.

In a ninth aspect of the present invention, any one of the first aspect to the eighth aspect of the present invention may be configured such that the first ribs and the second ribs are provided at mutually overlapping positions.

In the aspect described above, load can be effectively transmitted, since the first ribs and the second ribs are be provided at mutually overlapping positions.

In a tenth aspect of the present invention, the eighth aspect of the present invention may be configured such that an impact beam is attached to the vehicle door panel, and a recessed portion is formed at an end portion at the opposite side to the second attachment plate of the second load-transmitting member, the recessed portion is configured to be positioned at outside in a vehicle width direction of the vehicle door panel, in order to prevent interference with the impact beam in an attached state.

In the aspect described above, in the attached state to the vehicle door, interference of the second load-transmitting member with the impact beam can be prevented by the recessed portion formed at the end portion at the opposite side to the second attachment plate of the second load-transmitting member, the recessed portion is positioned at outside in the vehicle width direction of the vehicle door panel.

In an eleventh aspect of the present invention, the tenth aspect of the present invention may be configured such that the second end face wall portion is formed at a bottom portion of the recessed portion.

In the aspect described above, load from the impact beam can be effectively transmitted in the event of a colliding body colliding with the vehicle door in a direction from outside toward inside in the vehicle width direction, by the impact beam contacting the second end face wall portion formed at the bottom portion of the recessed portion.

In a twelfth aspect of the present invention, the tenth aspect of the present invention may be configured such that a lower portion of the second end face wall portion, the lower portion is below the impact beam, and is configured with a projecting shape that has a shorter protrusion height than an upper portion of the second end face wall portion, the upper portion is above the impact beam.

In the aspect described above, movement of the impact beam downward with respect to the load-transmitting member can be prevented in the event of a colliding body colliding with the vehicle door in the direction from outside toward inside in the vehicle width direction, by the lower portion of the second load-transmitting member being configured with a projecting shape.

A thirteenth aspect of the present invention provides a vehicle door attachment structure of a load-transmitting member in which the load-transmitting member of any one of the first to the twelfth aspects of the present invention is attached to a vehicle door panel, wherein the load-transmitting member is integrally formed with the first load-transmitting member and the second load-transmitting member, and is inserted into an opening portion formed at the vehicle door panel from inside of the vehicle door and attached to the vehicle door panel.

In the aspect described above, since the load-transmitting member of any one of the first to the twelfth aspect of the present invention is attached to a vehicle door panel, the operation and advantageous effects of the vehicle door previously described are achieved.

In a fourteenth aspect of the present invention, the thirteenth aspect of the present invention may be configured such that the load-transmitting member is interposed, through the recessed portion of the second load-transmitting member, between the impact beam and an underside reinforcement disposed at a vehicle body interior.

In the aspect described above, the load-transmitting member can transmit load, through the recessed portion of the second load-transmitting member, from the impact beam to the underside reinforcement disposed at a vehicle body interior in the event of a colliding body colliding with the vehicle door from outside toward inside in the vehicle width direction.

Advantageous Effects of Invention

The first aspect of the invention configured as described above enables versatility to be increased.

The second aspect of the invention configured as described above enables the first load-transmitting member and the second load-transmitting member to be easily integrated together.

The third aspect of the invention configured as described above enables the first load-transmitting member and the second load-transmitting member to be instantaneously integrated together.

The fourth aspect of the invention configured as described above enables the load-transmitting member to be attached to the panel member by working only from a face at one side of the overlapping flange portions.

The fifth aspect of the invention configured as described above enables positional misalignment when fixing the first load-transmitting member and the second load-transmitting member to the panel member to be prevented.

The sixth aspect of the invention configured as described above enables relative movement of the first load-transmitting member and the second load-transmitting member to be prevented.

The seventh aspect of the invention configured as described above enables load to be effectively transmitted.

The eighth aspect of the invention configured as described above enables versatility to be increased when attaching to a vehicle door.

The ninth aspect of the invention configured as described above enables load to be effectively transmitted.

The tenth aspect of the invention configured as described above enables interference between the second load-transmitting member and the impact beam to be prevented in an attached state to a vehicle door.

The eleventh aspect of the invention configured as described above enables load from the impact beam to be effectively transmitted.

The twelfth aspect of the invention configured as described above enables movement of the impact beam downward with respect to the load-transmitting member to be prevented.

The thirteenth aspect of the invention configured as described above enables the previously described operation and advantageous effects of a vehicle door to be achieved.

The fourteenth aspect of the invention configured as described above enables the load-transmitting member to transmit load through the recessed portion of the second load-transmitting member from the impact beam to the underside reinforcement disposed at a vehicle body interior in the event of a colliding body colliding with the vehicle door in a direction from outside toward inside in the vehicle width direction.

BRIEF DESCRIPTION OF DRAWINGS

FIG. 15 is a side cross-section view of a load-transmitting member according to a third exemplary embodiment, corresponding to FIG. 6.

DETAILED DESCRIPTION OF THE INVENTION

First Exemplary Embodiment

Figure 1:
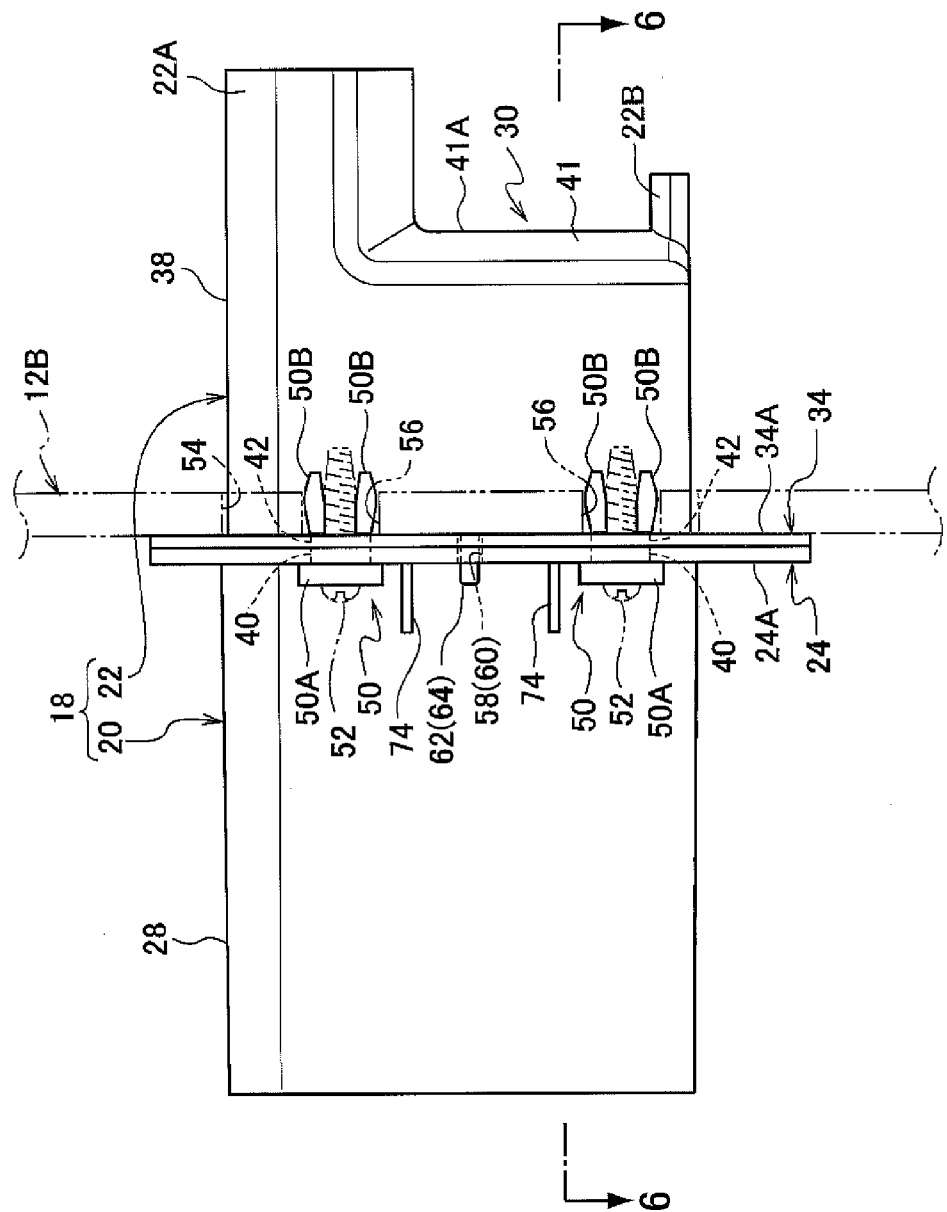
FIG. 1 is a side view illustrating a load-transmitting member according to a first exemplary embodiment of the present invention.

Explanation follows regarding a first exemplary embodiment of a load-transmitting member and a vehicle door attachment structure of the load-transmitting member of the present invention, with reference to FIG. 1 to FIG. 13.

Note that, in the drawings, the same reference numerals are appended to members (configuration elements) with the same or corresponding functions, and explanation is omitted as appropriate. Moreover, the arrow UP indicates a vehicle body upward direction, IN indicates the vehicle width inside direction and FR indicates the vehicle body front direction in some of the drawings.

Figure 13:
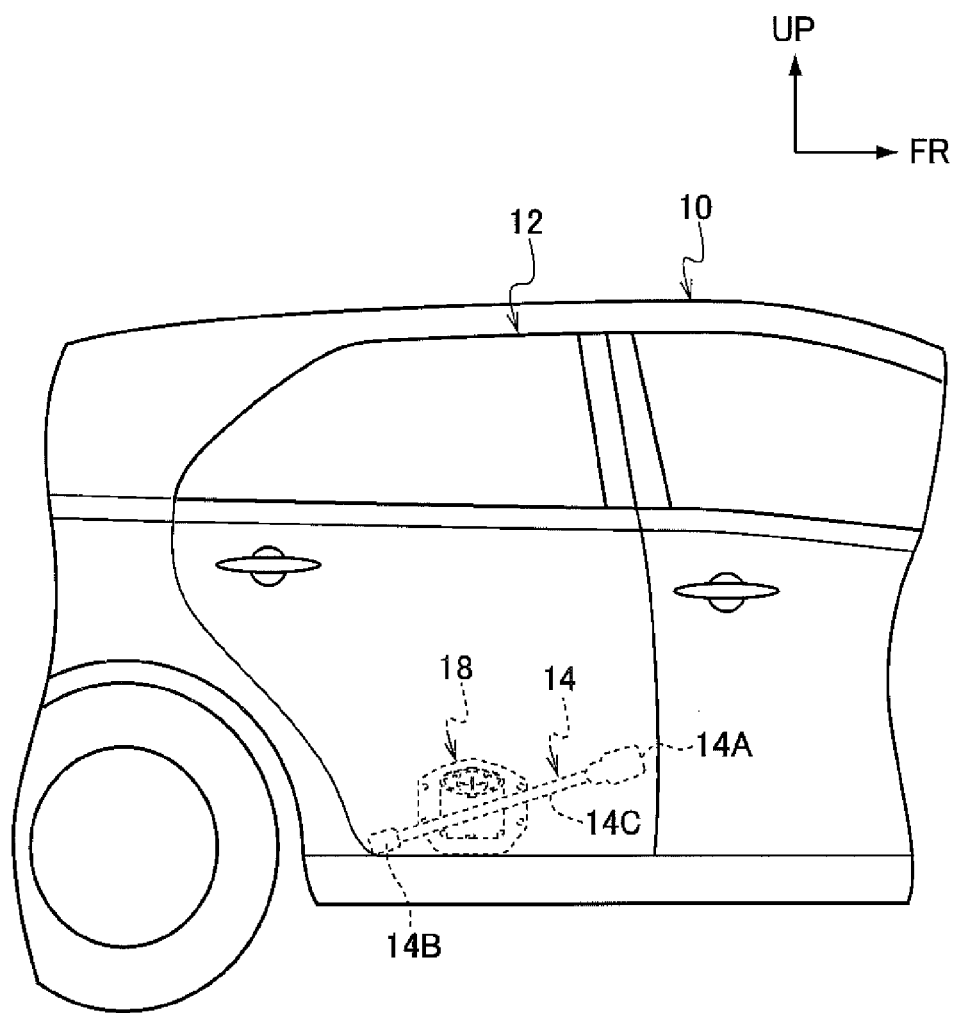
FIG. 13 is a side view of a side door to which the load-transmitting member according to the first exemplary embodiment is attached.

As illustrated in FIG. 13, a rear side door 12 is provided at a rear side section of a vehicle body 10. An impact beam 14 and a load-transmitting member 18 are attached inside the rear side door 12, at a position corresponding to a seating portion of a seat for an occupant, not illustrated in the drawings. The impact beam 14 is formed in an elongated shape, with a front end portion 14A fixed to a front end portion of the rear side door 12, and a rear end portion 14B fixed to a rear end portion of the rear side door 12, respectively.

Figure 11:
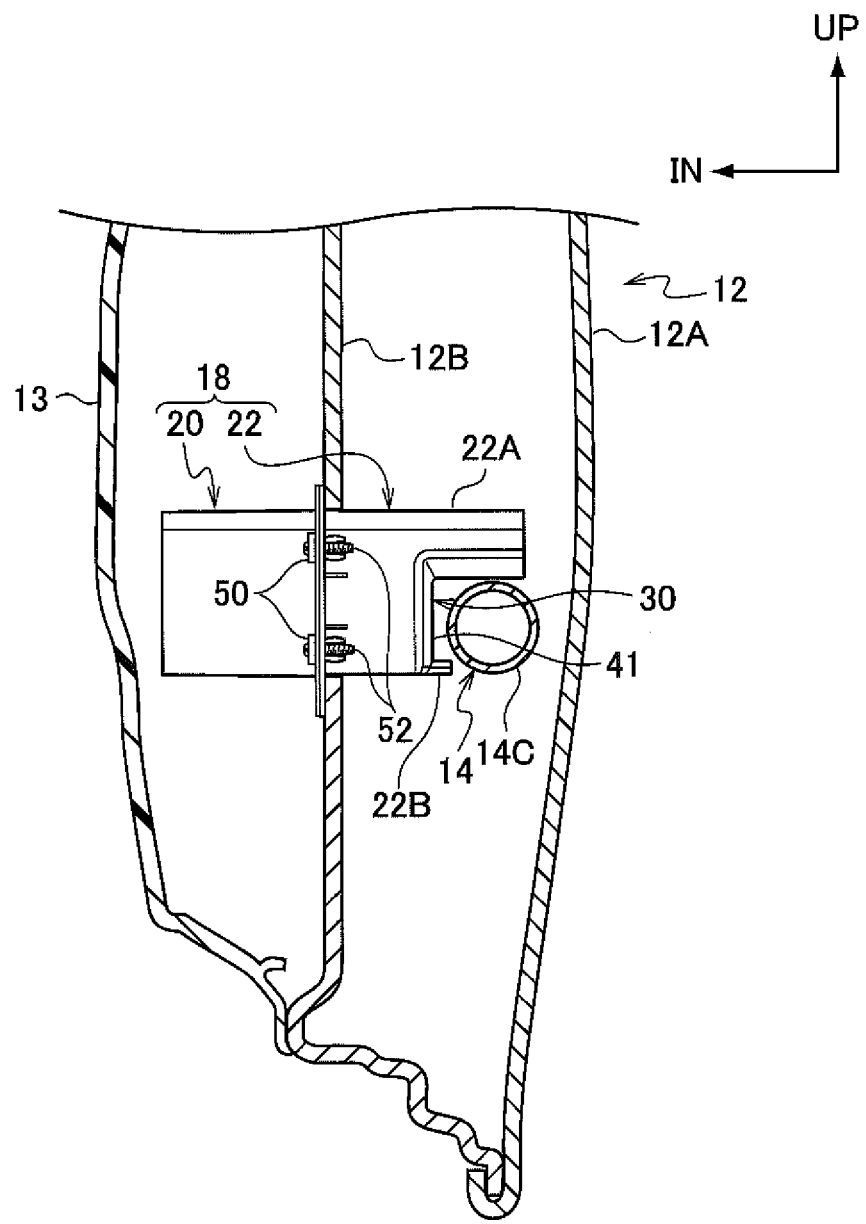
FIG. 11 is a cross-section view illustrating a side door to which the load-transmitting member according to the first exemplary embodiment of the present invention is attached, as viewed in the vehicle body front-rear direction.

As illustrated in FIG. 11, the rear side door 12 is provided with an outer panel 12A provided at the vehicle outside, and an inner panel 12B provided at the vehicle inside and serving as a panel member. A peripheral edge portion of the outer panel 12A and a peripheral edge portion of the inner panel 12B are joined together by welding, or the like. A space is formed between the outer panel 12A and the inner panel 12B, and a door interior member (a door trim) 13 is attached at the vehicle cabin side of the inner panel 12B. An intermediate portion 14C of the impact beam 14, excluding both end portions, is formed in a circular tube shape, and is disposed along a back face of the outer panel 12A of the rear side door 12.

Figure 12:
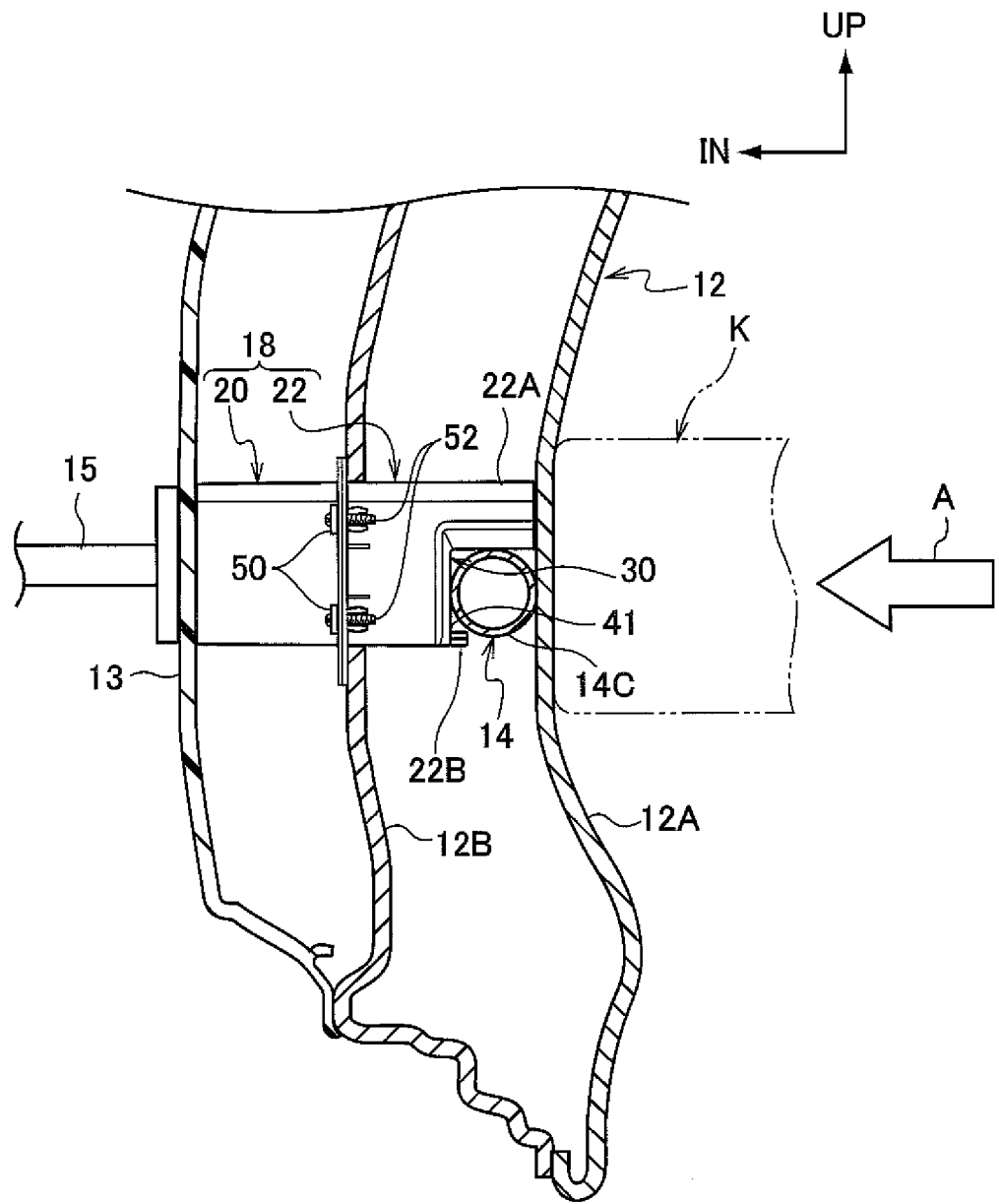
FIG. 12 is a cross-section view illustrating a state in which a side door to which the load-transmitting member according to the first exemplary embodiment of the present invention is attached receives a load, as viewed in the vehicle body front-rear direction.

As illustrated in FIG. 12, in the event of a colliding body K such as another vehicle colliding with the rear side door 12 in a direction from an outside toward an inside in the vehicle width direction (the arrow A direction in FIG. 12), deformation of the rear side door 12 in the vehicle cabin inside direction can be suppressed by the impact beam 14, and load due to the collision can be transmitted by the load-transmitting member 18 to underside reinforcement 15 and the like disposed at the vehicle body inside of the rear side door 12.

Load-Transmitting Member Configuration

Explanation follows regarding a configuration of the load-transmitting member 18.

As illustrated in FIG. 11, the load-transmitting member 18 is provided with an inside load-transmitting member 20 serving as a first load-transmitting member, and an outside load-transmitting member 2 serving as a second load-transmitting member. The inside load-transmitting member 20 and the outside load-transmitting member 22 are configured as separate members.

Figure 2:
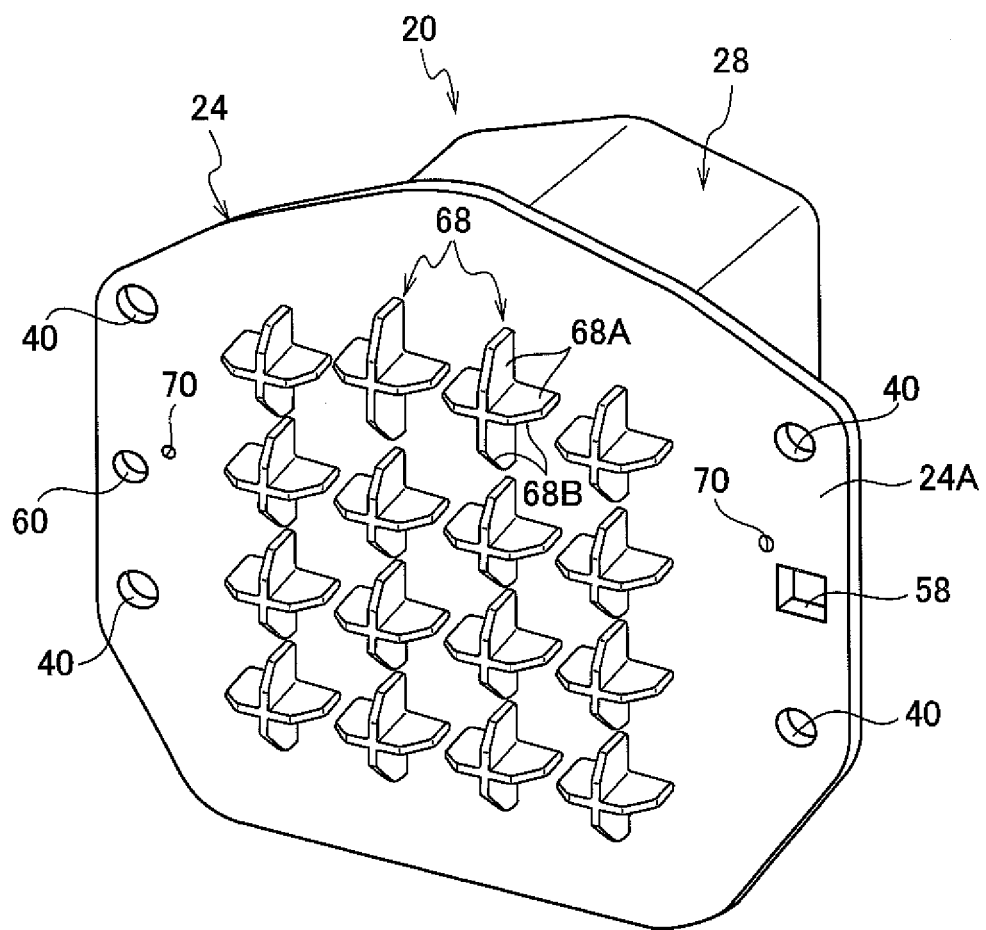
FIG. 2 is a perspective view illustrating a first load-transmitting member of the load-transmitting member according to the first exemplary embodiment of the present invention, as viewed from a first attachment plate side.
Figure 3:
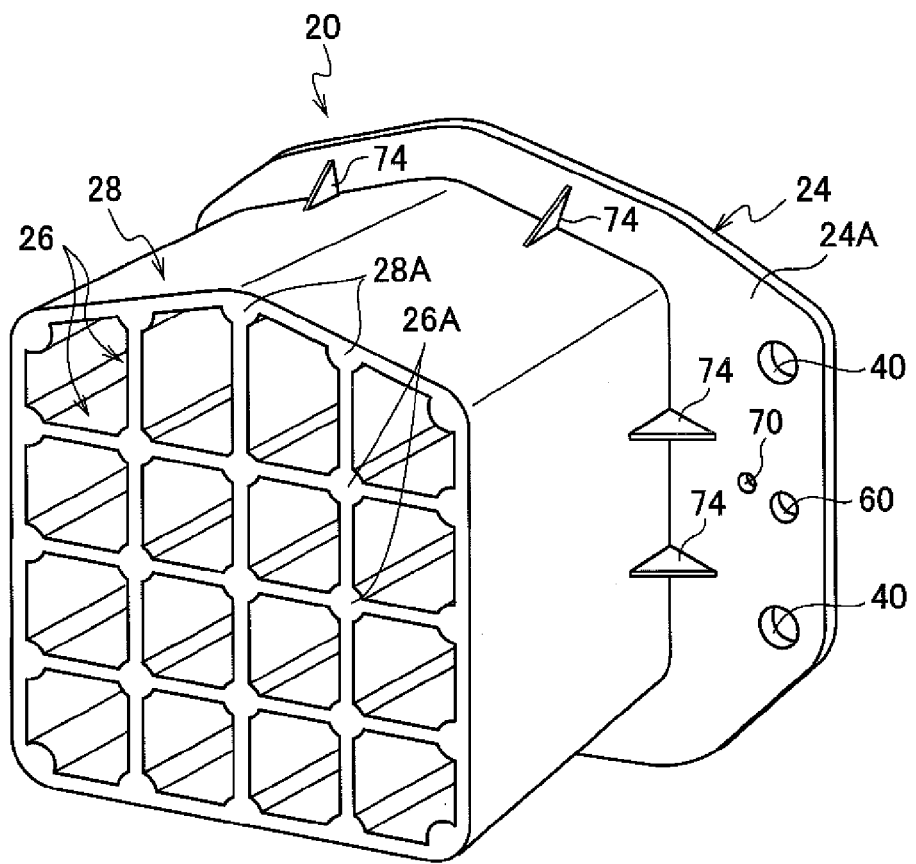
FIG. 3 is a perspective view illustrating the first load-transmitting member of the load-transmitting member according to the first exemplary embodiment of the present invention, as viewed from the opposite side to the first attachment plate.

As illustrated in FIG. 2 and FIG. 3, an attachment plate 24 serving as a first attachment plate is provided at one end of the inside load-transmitting member 20, and the attachment plate 24 is configured as a polygonal shaped plate section. Ribs 26 serving as plural first ribs, and an enclosing wall 28 serving as a first enclosing wall project out from one face of the attachment plate 24, and the enclosing wall 28 encloses the plural ribs 26. Specifically, the enclosing wall 28 is formed in a pentagonal shape, and the plural ribs 26 are arrayed in a lattice shape inside the enclosing wall 28. The projecting height of the ribs 26 is formed the same as the projecting height of the enclosing wall 28, and leading end faces of the ribs 26 are in the same plane as leading end faces of the enclosing wall 28.

Figure 4:
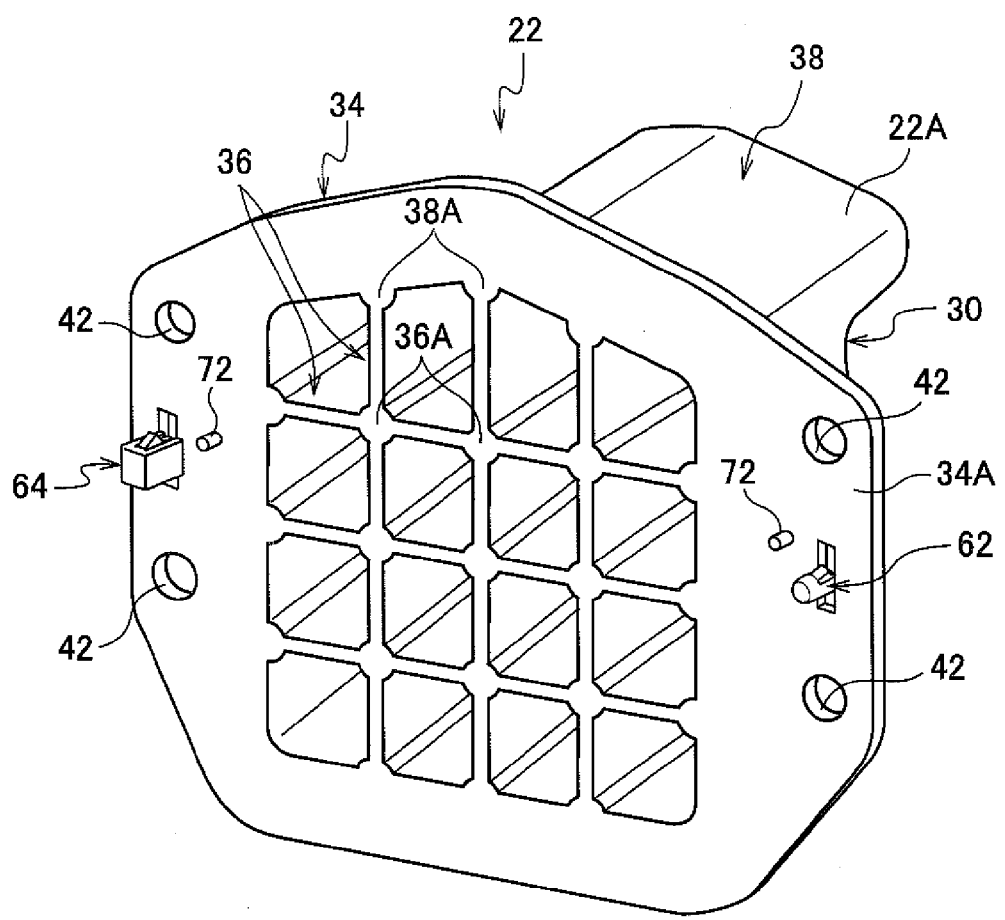
FIG. 4 is a perspective view illustrating a second load-transmitting member of the load-transmitting member according to the first exemplary embodiment of the present invention, as viewed from a second attachment plate side.
Figure 5:
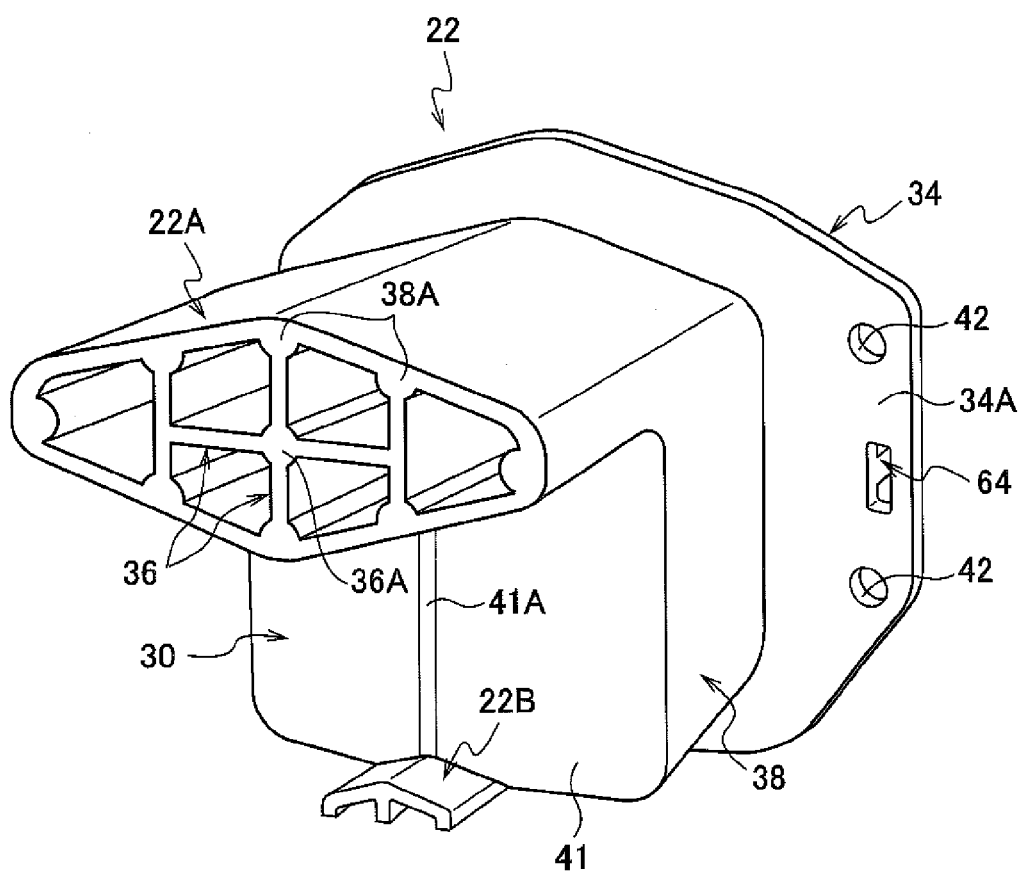
FIG. 5 is a perspective view illustrating the second load-transmitting member of the load-transmitting member according to the first exemplary embodiment of the present invention, as viewed from the opposite side to the second attachment plate.

As illustrated in FIG. 4 and FIG. 5, an attachment plate 34 serving as a second attachment plate is provided at one end of the outside load-transmitting member 22, and the attachment plate 34 is formed with a similar plate portion shape to the attachment plate 24 of the inside load-transmitting member 20. Ribs 36 serving as plural second ribs and an enclosing wall 38 serving as a second enclosing wall project out from one face of the attachment plate 34, and the enclosing wall 38 encloses the plural ribs 36. Specifically, the enclosing wall 38 of the outside load-transmitting member 22 is formed with a similar pentagonal shape to the enclosing wall 28 of the inside load-transmitting member 20, and the plural ribs 36 are arrayed in a lattice shape inside the enclosing wall 38. The projecting height of the ribs 36 is formed the same as the projecting height of the enclosing wall 38, and leading end faces of the ribs 36 are in the same plane as leading end faces of the enclosing wall 38.

As illustrated in FIG. 1, a recessed portion 30 is formed at an end portion of the outside load-transmitting member 22 at the opposite side to the attachment plate 34, in order to prevent interference with the impact beam 14 (see FIG. 11) in an attached state to the rear side door 12.

As illustrated in FIG. 5, at a bottom portion of the recessed portion 30 of the outside load-transmitting member 22, an end face wall portion 41 serving as a second end face wall portion is provided at leading ends of the ribs 36 enclosed by the enclosing wall 38 and is formed to block off spaces formed between the ribs 36 and the enclosing wall 38. The end face wall portion 41 forms an inclined face and a center portion thereof in the vehicle body front-rear direction forms an apex portion 41A in a state in which the end face wall portion 41 is attached to the rear side door 12.

An upper portion 22A that projects out from the end face wall portion 41 of the outside load-transmitting member 22 above the impact beam 14 (see FIG. 11), forms a rhombus shape provided with the ribs 36 and the enclosing wall 38 enclosing the ribs 36. A lower portion 22B that projects out from the end face wall portion 41 of the outside load-transmitting member 22, below the impact beam 14, is configured in a protruding shape that has a shorter projection height from the end face wall portion 41 and a smaller cross-section than the upper portion 22A.

Figure 6:
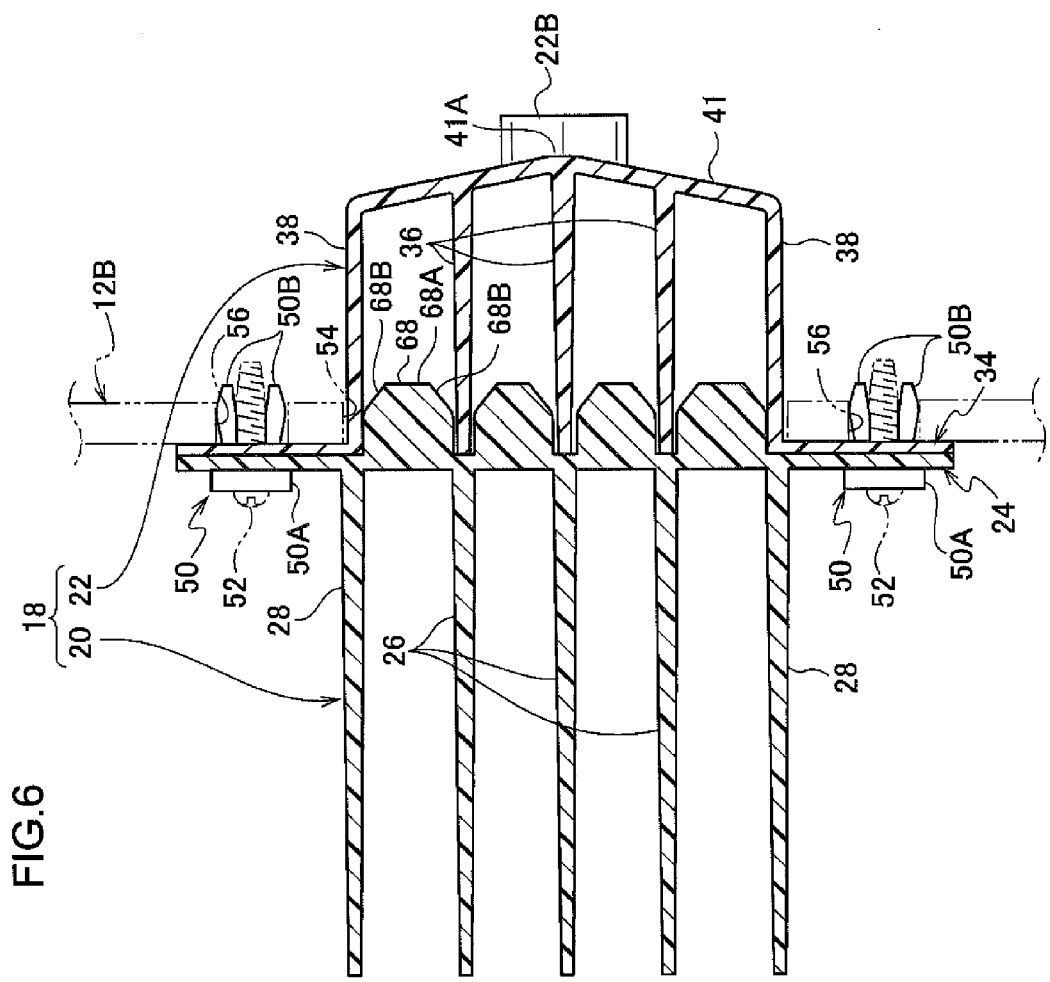
FIG. 6 is a cross-section view taken along cross-section line 6-6 in FIG. 1.

As illustrated in FIG. 6, the same number are provided of the ribs 26 of the inside load-transmitting member 20 and the ribs 36 of the outside load-transmitting member 22, at mutually overlapping positions, and the thickness of the ribs 26 is substantially the same as the thickness of the ribs 36.

Figure 7:
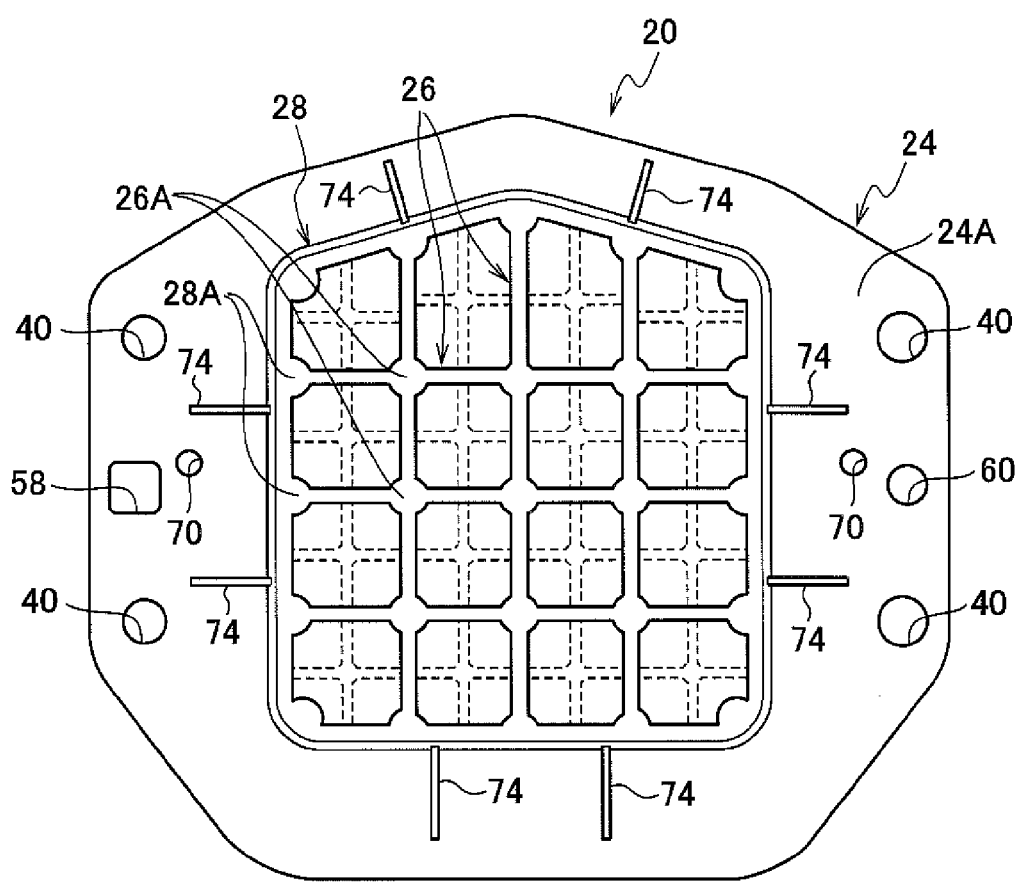
FIG. 7 is a plan view illustrating the first load-transmitting member of the load-transmitting member according to the first exemplary embodiment of the present invention, as viewed from the opposite side to the first attachment plate.

As illustrated in FIG. 7, circular pillar portions 26A and semi-circular pillar portions 28A are respectively provided at locations where the ribs 26 intersect with each other, and locations where the ribs 26 and the enclosing wall 28 intersect on the inside load-transmitting member 20. The circular pillar portions 26A and the semi-circular pillar portions 28A are configured thicker than other portions of the ribs 26 and the enclosing wall 28 in order to bear projecting pins projecting out from a mold when removing the inside load-transmitting member 20 from a mold (not illustrated in the drawings).

Providing the circular pillar portions 26A and the semi-circular pillar portions 28A in this manner enables the ribs 26 themselves and the enclosing wall 28 itself to be reinforced.

Figure 9:
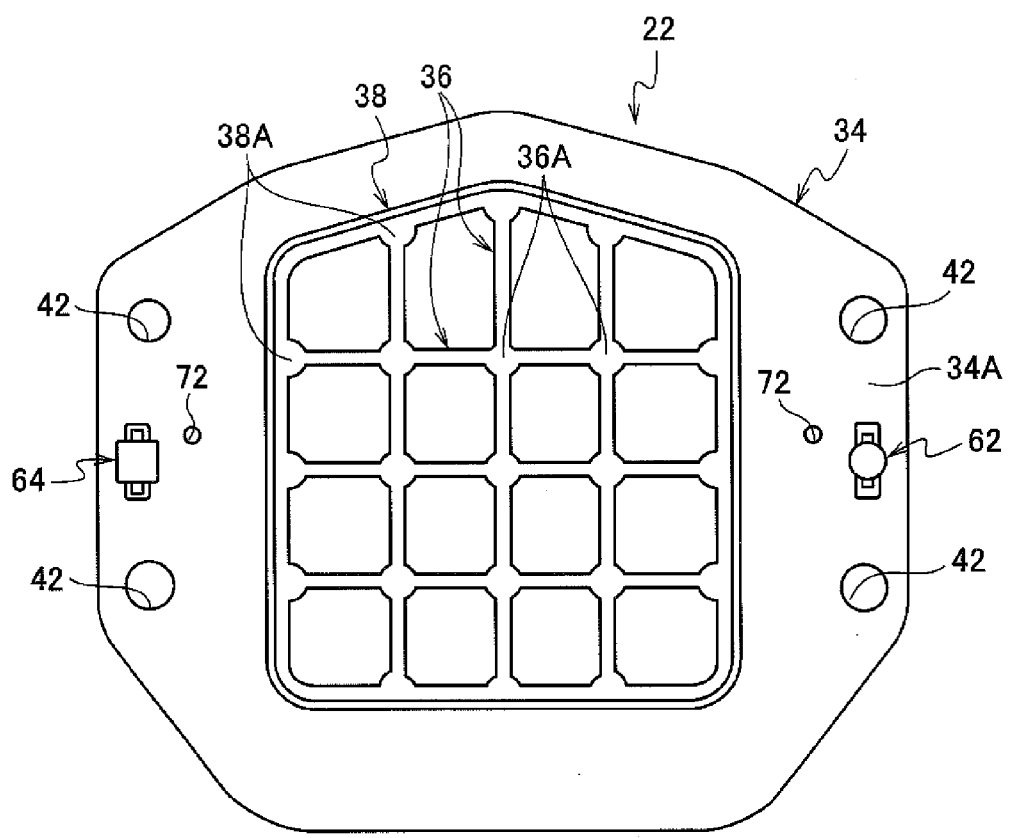
FIG. 9 is a plan view illustrating the second load-transmitting member of the load-transmitting member according to the first exemplary embodiment of the present invention, as viewed from the second attachment plate side.

As illustrated in FIG. 9, circular pillar portions 36A and semi-circular pillar portions 38A are respectively provided at locations where the ribs 36 intersect with each other, and locations where the ribs 36 and the enclosing wall 38 intersect on the outside load-transmitting member 20. The circular pillar portions 36A and the semi-circular pillar portions 38A are configured as thicker than other portions of the ribs 36 and the enclosing wall 38 in order to bear projecting pins projecting out from a mold when removing the outside load-transmitting member 22 from a mold (not illustrated in the drawings). Providing the circular pillar portions 36A and the semi-circular pillar portions 38A in this manner enables the ribs 36 themselves and the enclosing wall 38 itself to be reinforced.

Figure 10:
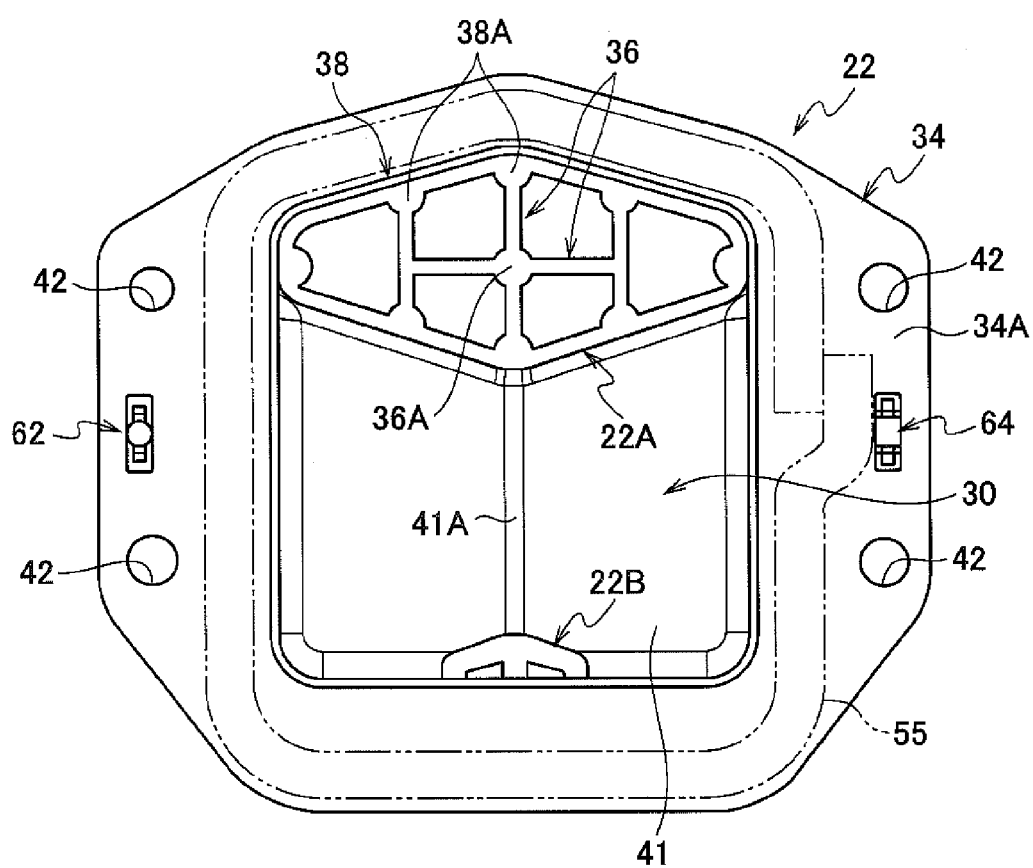
FIG. 10 is a plan view illustrating the second load-transmitting member of the load-transmitting member according to the first exemplary embodiment of the present invention, as viewed from the opposite side to the second attachment plate.

As illustrated in FIG. 7, a location of the attachment plate 24 of the inside load-transmitting member 20 extending outside the enclosing wall 28 configures a flange portion 24A serving as a first flange portion. As illustrated in FIG. 10, a location of the attachment plate 34 of the outside load-transmitting member 22 extending outside the enclosing wall 38 configures a flange portion 34A serving as a second flange portion. As illustrated in FIG. 1, the flange portion 24A of the inside load-transmitting member 20, and the flange portion 34A of the outside load-transmitting member 22 overlap each other.

Figure 8:
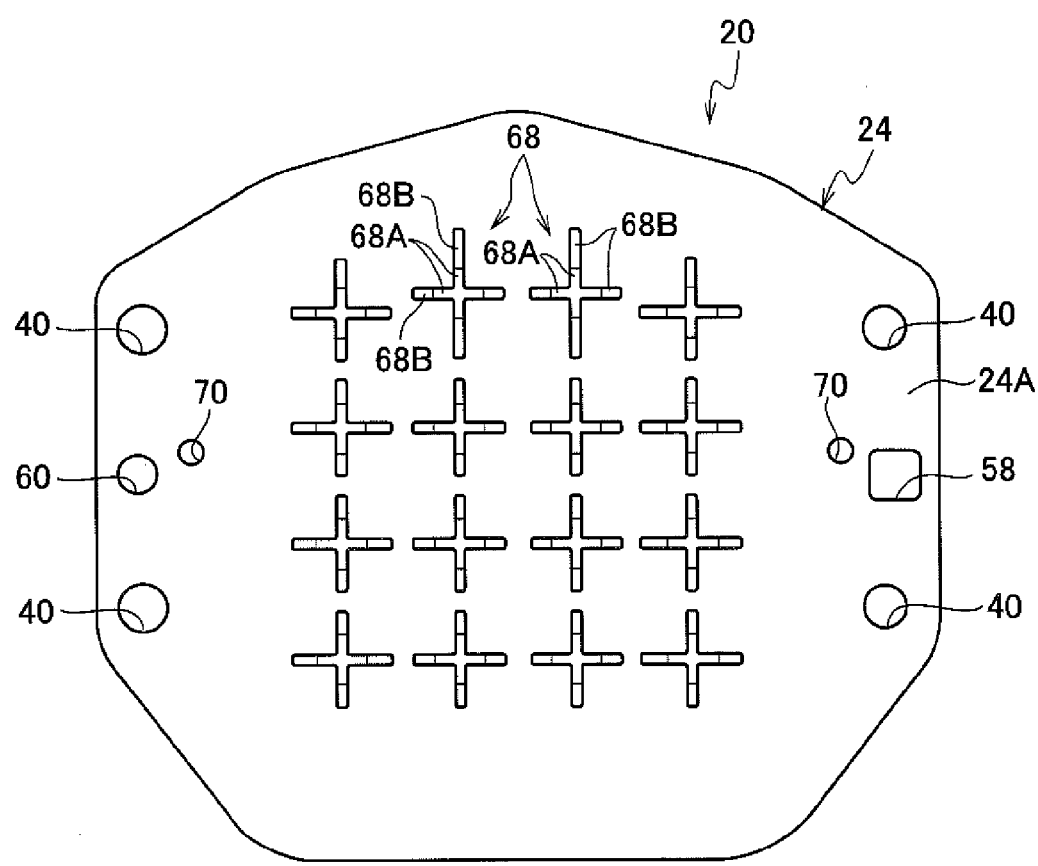
FIG. 8 is a plan view illustrating the first load-transmitting member of the load-transmitting member according to the first exemplary embodiment of the present invention, as viewed from the first attachment plate side.

As illustrated in FIG. 7 and FIG. 8, attachment holes 40, each serving as a first attachment hole, are formed at four corner portions at both end portions in the length direction of the flange portion 24A of the inside load-transmitting member 20 (the left-right direction in the drawings). The attachment holes 40 are formed in circular shapes, and serve as attachment holes for attaching the load-transmitting member 18 to the inner panel 12B.

As illustrated in FIG. 9 and FIG. 10, attachment holes 42, each serving as second attachment holes, are formed at four corner portions at both end portions in the length direction of the flange portion 34A of the outside load-transmitting member 22 (the left-right direction in the drawings). The attachment holes 42 are formed in circular shapes, and serve as attachment holes for attaching the load-transmitting member 18 to the inner panel 12B.

As illustrated in FIG. 1, screw grommets 50, serving as attachment members, are each insertable into the attachment holes 40 of the inside load-transmitting member 20 and the attachment holes 42 of the outside load-transmitting member 22. Each of the screw grommets 50 is provided with a head portion 50A serving as an engagement portion, and engagement tabs 50B serving as a pair of engagement portions that project out from the head portion 50A and are resiliently deformable in the radial direction of the screw grommet 50. The screw grommets 50 are inserted into the respective attachment holes 40, 42 from the inside load-transmitting member 20 side and the pairs of engagement tabs 50B open, whereby the flange portion 24A and the flange portion 34A are clamped between the head portions 50A and the engagement tabs 50B of the screw grommets 50 and are retained in an overlapping state.

A polygonal shaped opening portion 54, corresponding to the enclosing wall 38 of the outside load-transmitting member 22, is formed at the inner panel 12B, and the enclosing wall 38 of the outside load-transmitting member 22 is insertable into the opening portion 54. Note that the external shape of the flange portion 34A of the outside load-transmitting member 22 is formed larger than the opening portion 54, and, in a state in which the enclosing wall 28 of the outside load-transmitting member 22 is inserted into the opening portion 54, the flange portion 34A is brought into face-to-face contact with a peripheral portion of the opening portion 54 of the inner panel 12B.

Note that, as illustrated by the double-dotted dashed lines in FIG. 10, sticking a seal member 55 in advance to an outer peripheral portion of the enclosing wall 38 of the flange portion 34A of the outside load-transmitting member 22 enables the seal member 55 to seal between the flange portion 34A and the peripheral portion of the opening portion 54 of the inner panel 12B.

As illustrated in FIG. 1, attachment holes 56 are each formed at the inner panel 12B in the vicinity of the opening portion 54, at four locations corresponding to the attachment holes 40 of the inside load-transmitting member 20. The engagement tabs 50B of the screw grommets 50 are insertable into the attachment holes 56. The engagement tabs 50B are formed with a narrower width than tapping screws 52 screwed to the screw grommets 50. In a state in which the engagement tabs 50B are inserted into the attachment holes 56, the engagement tabs 50B accordingly widen when the tapping screws 52 are screwed into the screw grommets 50 from the head portion 50A side. The engagement tabs 50B are thereby engaged at the peripheral edge portions of the attachment holes 56, the inner panel 12B is clamped between the flange portion 34A of the outside load-transmitting member 22 and the engagement tabs 50B, and the load-transmitting member 18 is retained. Namely, the load-transmitting member 18 is fixed to the inner panel 12B.

As illustrated in FIG. 8, engagement holes 58, 60, serving as engaged portions that are engagement structures, are formed at the flange portion 24A of the inside load-transmitting member 20. The engagement holes 58, 60 are each formed at positions that oppose to each other on the flange portion 24A, and are each formed at center portions between two adjacent attachment holes 40. The one engagement hole 58 is a rectangular hole, and the other engagement hole 60 is a circular hole.

As illustrated in FIG. 9, engagement pawls 62, 64 that are engagement structures are formed at the flange portion 34A of the outside load-transmitting member 22, projecting toward the opposite direction to the ribs 36 and the enclosing wall 38. The engagement pawls 62, 64 are formed at two locations in positions that oppose to each other on the flange portion 34A, and are each formed at center portions between two adjacent attachment holes 42. The one engagement pawl 62 is formed in a circular shape viewed from the axial direction, and the other engagement pawl 64 is formed in a rectangular shape viewed from the axial direction. By fitting together the flange portion 24A of the inside load-transmitting member 20 and the flange portion 34A of the outside load-transmitting member 22, the engagement pawl 62 is thereby inserted into and engaged with the engagement hole 60, and the engagement pawl 64 is inserted into and engaged with the engagement hole 58. The inside load-transmitting member 20 and the outside load-transmitting member 22 configuring the load-transmitting member 18 are thereby integrated together.

As illustrated in FIG. 2, plural misalignment prevention protrusions 68 are formed at a face of the attachment plate 24 of the inside load-transmitting member 20 at the opposite side to the face where the enclosing wall 28 is formed. Each of the misalignment prevention protrusions 68 is configured by two orthogonal wall portions 68A, and the leading end corner portions 68B of each of the wall portions 68A of the misalignment prevention protrusions 68 are formed as inclined faces.

As illustrated in FIG. 6, the misalignment prevention protrusions 68 of the inside load-transmitting member 20 are fittable in the spaces formed between the ribs 36 and the enclosing wall 38 of the outside load-transmitting member 22. By fitting the misalignment prevention protrusions 68 of the inside load-transmitting member 20 into the spaces formed between the ribs 36 and the enclosing wall 38 of the outside load-transmitting member 22, relative movement of the inside load-transmitting member 20 and the outside load-transmitting member 22 along the in-plane direction of the attachment plates 24, 34 can be prevented. Moreover, forming the leading end corner portions 68B of each of the wall portions 68A of the misalignment prevention protrusions 68 as inclined faces facilitates the fitting of the misalignment prevention protrusions 68 into the spaces formed between the ribs 36 and the enclosing wall 38 of the outside load-transmitting member 22.

Note that the reference numerals 70 illustrated in FIG. 2 indicate circular holes formed at the flange portion 24A of the inside load-transmitting member 20, and pins, indicated by the reference numerals 72 formed at the flange portion 34A of the outside load-transmitting member 22, illustrated in FIG. 4, are insertable into these circular holes 70. Moreover, the reference numerals 74 illustrated in FIG. 3 indicate ribs that couple the flange portion 24A and the enclosing wall 28 of the inside load-transmitting member 20 together.

Operation and Advantageous Effects

Explanation follows regarding operation and advantageous effects of the load-transmitting member 18.

As illustrated in FIG. 1, in the present exemplary embodiment, the load-transmitting member 18 includes the inside load-transmitting member 20 and the outside load-transmitting member 22. By engaging the engagement pawls 62, 64 provided at the flange portion 34A of the attachment plate 34 of the outside load-transmitting member 22 with the engagement holes 58, 60 provided at the flange portion 24A of the attachment plate 24 of the inside load-transmitting member 20, the inside load-transmitting member 20 and the outside load-transmitting member 22 are engaged together as an integral unit.

As a result, for example, cases in which the load-transmitting member 18 is attached to a rear side door of another vehicle, or attached to a door other than the rear side door 12, such as a front side door, can sometimes be addressed by applying one out of the inside load-transmitting member 20 and the outside load-transmitting member 22 as a common member, and changing the shape of the other member according to members such as the impact beam 14 that are present at locations where the load-transmitting member 18 is attached. The overall shape of the load-transmitting member 18 does not therefore need to be revised, and versatility is increased. This enables common application of the inside load-transmitting member 20 or the outside load-transmitting member 22 to different vehicle bodies, and increases the flexibility for dimensions of the load-transmitting member 18, the flexibility for mold removal direction, and so on.

When attaching the load-transmitting member 18 of the present exemplary embodiment to the inner panel 12B of the rear side door 12, the load-transmitting member 18, with the inside load-transmitting member 20 and the outside load-transmitting member 22 integrated together in advance, is inserted in the opening portion 54 of the inner panel 12B from inside of the rear side door 12 in the door assembly process. The flange portion 34A of the outside load-transmitting member 22 is then brought into face-to-face contact with the peripheral portion of the opening portion 54 of the inner panel 12B. When this is performed, the screw grommets 50, pre-fitted to the overlapping attachment holes 40 of the inside load-transmitting member 20 and the attachment holes 42 of the outside load-transmitting member 22, are inserted into the attachment holes 56 of the inner panel 12B. Then, screwing the tapping screws 52 into the screw grommets 50 from inside of the rear side door 12 enables the load-transmitting member 18 to be fixed to the inner panel 12B.

The load-transmitting member 18 can thereby be attached to the inner panel 12B by working only from one side, from inside of the rear side door 12. Assembly work efficiency is accordingly improved.

In the load-transmitting member 18 of the present exemplary embodiment, the plural ribs 26 and the enclosing wall 28 of the first load-transmitting member 22, and the plural ribs 36 and the enclosing wall 38 of the second load-transmitting member extend in the same direction, this being the vehicle width direction, thereby facilitating manufacture. Moreover, as illustrated in FIG. 12, in the event of the colliding body K such as another vehicle colliding with the rear side door 12 in the direction from outside toward inside in the vehicle width direction (the arrow A direction in FIG. 12), a high load-transmitting strength can be obtained by the outside load-transmitting member 22 and the inside load-transmitting member 20. Load from outside of the vehicle body can therefore be effectively transmitted to the underside reinforcement 15 and the like disposed at the inside of the rear side door 12.

In the load-transmitting member 18 of the present exemplary embodiment, engagement holes 58, 60 are formed at the flange portion 24A of the inside load-transmitting member 20, and engagement pawls 62, 64 are formed at the flange portion 34A of the outside load-transmitting member 22. By overlapping the flange portion 24A of the inside load-transmitting member 20 and the flange portion 34A of the outside load-transmitting member 22, the inside load-transmitting member 20 is engaged with the outside load-transmitting member 22 through the engagement holes 58, 60 and the engagement pawls 62, 64. The inside load-transmitting member 20 and the outside load-transmitting member 22 can accordingly be easily and instantaneously integrated together.

In the present exemplary embodiment, the flange portion 24A of the inside load-transmitting member 20 and the flange portion 34A of the outside load-transmitting member 22 are clamped together by the head portions 50A and the engagement tabs 50B of the screw grommets 50 which are used to fix the load-transmitting member 18 to the inner panel 12B. This enables positional misalignment of the inside load-transmitting member 20 and the outside load-transmitting member 22 to be prevented when the load-transmitting member 18 is fixed to the inner panel 12B.

In the load-transmitting member 18 of the present exemplary embodiment, the misalignment prevention protrusions 68 of the inside load-transmitting member 20 can be inserted and fitted into the spaces formed between the ribs 36 and the enclosing wall 38 of the outside load-transmitting member 22. This thereby enables relative movement of the outside load-transmitting member 22 and the inside load-transmitting member 20 along the in-plane direction of the attachment plates 34, 24 to be prevented in the event of load being applied to the outside load-transmitting member 22 of the load-transmitting member 18. Moreover, the leading end corner portions 68B of each of the wall portions 68A of the misalignment prevention protrusions 68 are formed as inclined faces. This enables easy insertion of the misalignment prevention protrusions 68 into the spaces formed between the ribs 36 and the enclosing wall 38 of the outside load-transmitting member 22.

In the load-transmitting member 18 of the present exemplary embodiment, the end face wall portion 41 is formed to the recessed portion 30 of the outside load-transmitting member 22. Consequently, as illustrated in FIG. 12, in the event of the colliding body K such as another vehicle colliding with the rear side door 12 in the direction from outside toward inside in the vehicle width direction (the arrow A direction in FIG. 12), load from the impact beam 14 can be effectively transmitted by contact of the impact beam 14 with the end face wall portion 41.

Moreover, in the load-transmitting member 18 of the present exemplary embodiment, in the event of the colliding body K such as another vehicle colliding with the rear side door 12 in the direction from outside toward inside in the vehicle width direction (the arrow A direction in FIG. 12), downward movement of the impact beam 14 with respect to the load-transmitting member 18 can be prevented by the lower portion 22B of the outside load-transmitting member 22.

Other Exemplary Embodiments

Details of a particular exemplary embodiment of the present invention are explained above, however the invention is not limited to the above exemplary embodiment, and it would be obvious to a practitioner skilled in the art that various embodiments may be implemented within the scope of the present invention. For example, in the above exemplary embodiment, the plural ribs 26 and ribs 36 are arrayed in respective lattice shapes, however the arrays do not necessarily have to be in lattice shapes, as long as a pre-set load-transmitting strength can be obtained.

For example, the plural ribs 26 and ribs 36 may be disposed so as to form a hexagonal shape (a honeycomb shape), not illustrated in the drawings. Moreover, all of the ribs do not necessarily need to be coupled to each other, and a state may be provided in which ribs are coupled together in sets of plural ribs, or plural ribs are independent of each other. Moreover, although the enclosing walls 28, 38 described herein are formed in a pentagonal shape, the shapes is not necessarily pentagonal, and may be a circular shape, as long as each of the ribs 26, 36 are enclosed.

Figure 14:
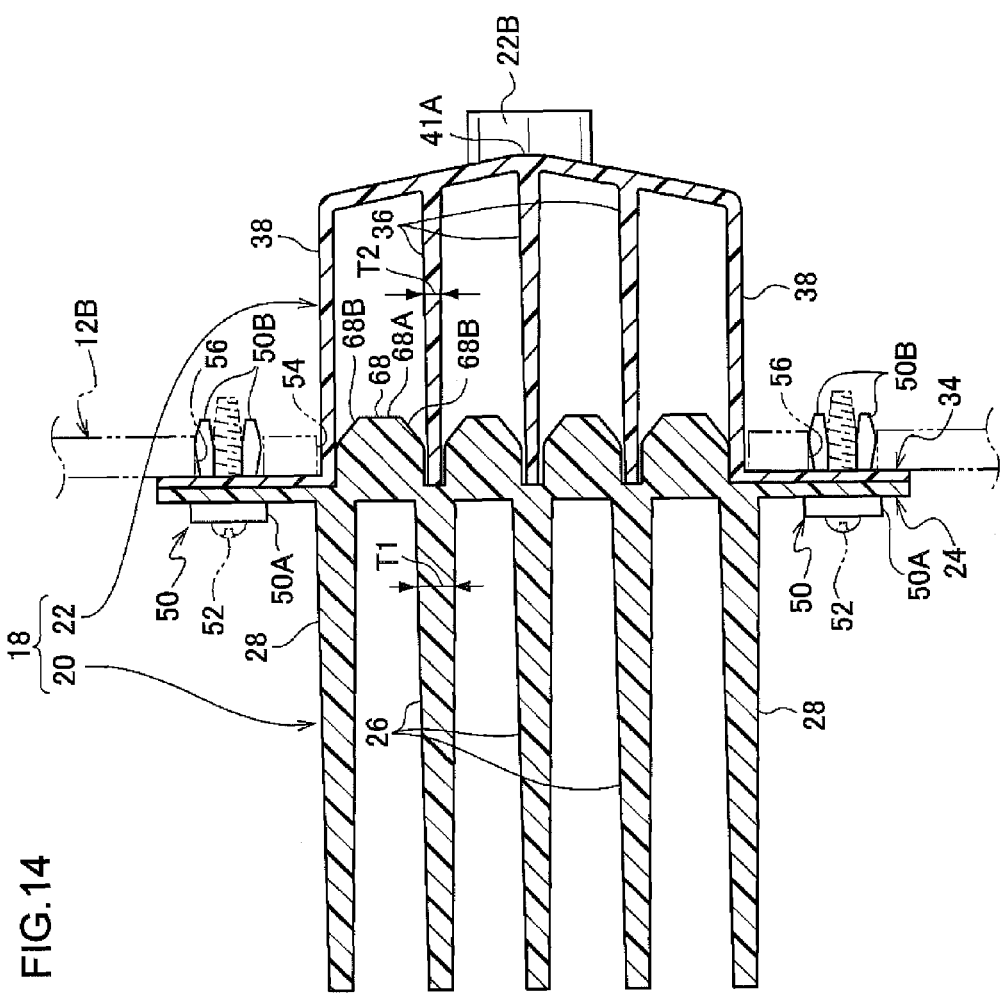
FIG. 14 is a side cross-section view of a load-transmitting member according to a second exemplary embodiment, corresponding to FIG. 6.

Moreover, as in a second exemplary embodiment illustrated in FIG. 14, by setting the thickness of the ribs 36 (T2) of the outside load-transmitting member 22 thinner than the thickness of the ribs 26 (T1) of the inside load-transmitting member 20 (T2<T1), the strength of the ribs 36 may be set lower than that of the ribs 26, and the load-transmitting capability of the outside load-transmitting member 22 may be set higher than that of the inside load-transmitting member 20.

Moreover, as in a third exemplary embodiment illustrated in FIG. 15, by setting the number of ribs 36 of the outside load-transmitting member 22 fewer than the number of ribs 26 of the inside load-transmitting member 20, the strength of the outside load-transmitting member 22 may be set lower than that of the inside load-transmitting member 20, and the load-transmitting capability of the outside load-transmitting member 22 may be set higher than that of the inside load-transmitting member 20. The second exemplary embodiment and the third exemplary embodiment may also be combined.

Although not illustrated in the drawings, the thickness of the ribs 26, 36 and the enclosing walls 28, 38 may be formed in stepped shapes, such that the load-transmitting capability changes in steps. This enables the load-transmitting capability to be controlled in steps.

Although in each of the exemplary embodiments described above, the engagement pawls 62, 64 serving as the engagement structures, and the engagement holes 58, 60 serving as an example of engaged portions are employed, other engaged portions, such as notches, may be employed as engaged portions instead of the engagement holes, and other engagement structures may be employed as engagement portions instead of the engagement pawls and engaged portions.

In each of the exemplary embodiments described above, the engagement holes 58, 60 are formed at the flange portion 24A of the attachment plate 24 of the inside load-transmitting member 20, and the engagement pawls 62, 64 are formed at the flange portion 34A of the attachment plate 34 of the outside load-transmitting member 22. Instead of this, a configuration may be adopted in which engagement pawls are formed at the flange portion 24A of the attachment plate 24 of the inside load-transmitting member 20, and engagement holes are formed at the portion 34A of the attachment plate 34 of the outside load-transmitting member 22. A configuration may also be adopted in which engagement structures are provided at a location other than the flange portions 24A, 34A of the attachment plates 24, 34.

Although in each of the exemplary embodiments described above, the load-transmitting member 18 is fixed to the inner panel 12B by the screw grommets 50 serving as an attachment member, other grommets such as pin grommets may be employed instead of the screw grommets 50. Moreover, the load-transmitting member 18 may be fixed to the inner panel 12B by an attachment member other than grommets.

Although in each of the exemplary embodiments described above, the misalignment prevention protrusions 68 are formed at the inside load-transmitting member 20, a configuration may be adopted instead in which misalignment prevention protrusions formed at the outside load-transmitting member 22 are insertable into spaces formed between the ribs 26 and the enclosing wall 28 of the inside load-transmitting member 20.

In each of the exemplary embodiments described above, the end face wall portion 41 serving as a second end face wall portion, that is formed at the leading end of the ribs 36 enclosed by the enclosing wall 38 and that blocks the space formed by the ribs 36 and the enclosing wall 38, is provided at the outside load-transmitting member 22 serving as a second load-transmitting member. However, as long as forming is possible, an end face wall portion serving as a first end face wall portion, that blocks off the spaces formed between the ribs 26 and the enclosing wall 28, may be provided at the leading end of the ribs 26 enclosed by the enclosing wall 28 on the inside load-transmitting member 20 serving as a first load-transmitting member.

The load-transmitting member and the vehicle door attachment structure of the load-transmitting member of the present invention may be applied to a door on a vehicle body other than the rear side door 12, such as a front side door, and may be applied to a panel member other than a door, such as a side panel. Application is also possible to a panel member other than those on a vehicle body.

The invention claimed is:
1. A load-transmitting member comprising:
a first load-transmitting member configured to transmit load and includes a first attachment plate that is configured to be attachable to a panel member, and that has a plurality of first ribs projecting out from one face of the first attachment plate and a first enclosing wall that projects out from the first attachment plate and encloses the first ribs;

a second load-transmitting member configured to transmit load and includes a second attachment plate that is overlapped with the first attachment plate, and that has a plurality of second ribs projecting out from one face of the second attachment plate and a second enclosing wall that projects out from the second attachment plate and encloses the second ribs;

engagement structures provided at the first attachment plate and the second attachment plate in order to engage the first attachment plate with the second attachment plate; and a misalignment prevention protrusion formed at one of the first attachment plate or the second attachment plate, the misalignment prevention protrusion being fitted into a space formed: (i) between the ribs; or (ii) between the rib and the enclosing wall on the other of: (a) the first attachment plate, or (b) the second attachment plate.

2. The load-transmitting member of claim 1, wherein the engagement structures are formed at a first flange portion and a second flange portion, the first flange portion is provided at the first attachment plate and is extended to outside of the first enclosing wall, and the second flange portion is provided at the second attachment plate and is extended to outside of the second enclosing wall so as to overlap with the first flange portion.

3. The load-transmitting member of claim 2, wherein the engagement structures include an engagement pawl that is provided to one of the first flange portion or the second flange portion, and an engaged portion that is provided to the other of the first flange portion or the second flange portion and engages with the engagement pawl.

4. The load-transmitting member of claim 2, wherein:
a first attachment hole is formed at the first flange portion for attachment to the panel member;
a second attachment hole is formed at the second flange portion for attachment to the panel member;
the first attachment hole and the second attachment hole are aligned with each other by overlapping the first flange portion and the second flange portion; and
an attachment member is inserted into the first attachment hole and the second attachment hole from one side of a face of the overlapped first flange portion and second flange portion.

5. The load-transmitting member of claim 4, wherein the attachment member includes an engagement portion that opens on insertion into the first attachment hole and the second attachment hole, and the attachment member is fixed to an attachment hole formed in the panel member so as to retain an overlapped state of the first flange portion and the second flange portion.

6. The load-transmitting member of claim 1, further comprising at least one of a first end face wall portion or a second end face wall portion, the first end face wall portion provided at a leading end of the first ribs enclosed by the first enclosing wall and blocking spaces formed between the first ribs and the first enclosing wall, and the second end face wall portion provided at a leading end of the second ribs enclosed by the second enclosing wall and blocking spaces formed between the second ribs and the second enclosing wall.

7. The load-transmitting member of claim 1, wherein the panel member is a vehicle door panel.

8. The load-transmitting member of claim 1, wherein the first ribs and the second ribs are provided at mutually overlapping positions.

9. The load-transmitting member of claim 7, wherein:
an impact beam is attached to the vehicle door panel; and
a recessed portion is formed at an end portion at the opposite side to the second attachment plate of the second load-transmitting member, the recessed portion being configured to be positioned at outside in a vehicle width direction of the vehicle door panel, in order to prevent interference with the impact beam in an attached state.

10. The load-transmitting member of claim 9, wherein the second end face wall portion is formed at a bottom portion of the recessed portion.

11. The load-transmitting member of claim 9, wherein a lower portion of the second end face wall portion is below the impact beam, and is configured with a projecting shape that has a shorter protrusion height than an upper portion of the second end face wall portion, the upper portion being above the impact beam.

12. A vehicle door attachment structure of a load-transmitting member in which the load-transmitting member of claim 1 is attached to a vehicle door panel, wherein:
the load-transmitting member is integrally formed with the first load-transmitting member and the second load-transmitting member, and is inserted into an opening portion formed at the vehicle door panel from inside of the vehicle door and attached to the vehicle door panel.

13. The vehicle door attachment structure of the load-transmitting member of claim 9, wherein the load-transmitting member is interposed, through the recessed portion of the second load-transmitting member, between the impact beam and underside reinforcement disposed at a vehicle body interior.

* * * * *